(12) United States Patent
Selwa (10) Patent No.: US 9,833,073 B2
(45) Date of Patent: Dec. 5, 2017

(54) EASEL WITH A BUILT-IN CONNECTING DEVICE FOR A MOUNTING MECHANISM

(71) Applicant: Robert Allen Selwa, Saint Clair Shores, MI (US)

(72) Inventor: Robert Allen Selwa, Saint Clair Shores, MI (US)

( * ) Notice: Subject to any disclaimer, the term of this patent is extended or adjusted under 35 U.S.C. 154(b) by 0 days.

(21) Appl. No.: 15/189,722

(22) Filed: Jun. 22, 2016

(65) Prior Publication Data

US 2017/0020288 A1 Jan. 26, 2017

Related U.S. Application Data

(60) Provisional application No. 62/195,550, filed on Jul. 22, 2015.

(51) Int. Cl.
| | |
|---|---|
| A47B 97/04 | (2006.01) |
| F16M 11/14 | (2006.01) |
| F16M 13/02 | (2006.01) |
| F16M 11/20 | (2006.01) |
| F16M 11/26 | (2006.01) |
| F16M 11/16 | (2006.01) |
| F16B 2/12 | (2006.01) |
| F16M 11/24 | (2006.01) |

(52) U.S. Cl.
CPC .............. *A47B 97/04* (2013.01); *F16B 2/12* (2013.01); *F16M 11/14* (2013.01); *F16M 11/16* (2013.01); *F16M 11/2078* (2013.01); *F16M 11/242* (2013.01); *F16M 11/26* (2013.01); *F16M 13/02* (2013.01); *F16M 2200/068* (2013.01)

(58) Field of Classification Search
CPC ....... A47B 83/00; A47B 97/001; A47B 97/04; F16B 2/12
USPC ...................................................... 248/447.1
See application file for complete search history.

(56) References Cited

U.S. PATENT DOCUMENTS

| | | | | | |
|---|---|---|---|---|---|
| 439,098 | A | * | 10/1890 | Blake | F16M 11/10 |
| | | | | | 248/183.4 |
| 2,729,018 | A | * | 1/1956 | Morgan | A47B 41/04 |
| | | | | | 248/448 |
| 3,738,606 | A | * | 6/1973 | Millen | A47B 97/08 |
| | | | | | 108/15 |
| 3,926,398 | A | * | 12/1975 | Vincent | A47B 97/08 |
| | | | | | 248/448 |
| 4,690,363 | A | * | 9/1987 | Koves | A47B 97/08 |
| | | | | | 248/163.1 |
| 4,699,346 | A | * | 10/1987 | Bahm | A47B 97/04 |
| | | | | | 108/90 |
| 5,791,623 | A | | 8/1998 | Louridas | |
| 6,889,952 | B2 | * | 5/2005 | Cook | A47B 97/08 |
| | | | | | 248/448 |
| 7,377,476 | B2 | * | 5/2008 | Almond | A47B 97/08 |
| | | | | | 248/448 |

\* cited by examiner

*Primary Examiner* — Joshua Rodden (57) ABSTRACT

A detachable easel to convert a camera tripod into an artist easel. The easel consists of a one or two arm design employing a built-in adapter, or connecting device in the center of the arm(s) of the attaching easel whereby the easel arm attaches directly to the mounting device of the tripod by way of the connecting device, allowing the tripod features to be extended to the easel. Attributes such as the tilting, raising, and rotating features of the tripod are then incorporated and translated as new easel functions. This can be a one or two arm embodiment, and can also attach to a wall mount or telescoping arm.

3 Claims, 8 Drawing Sheets

© 2017 by Robert A. Selwa

Figures 1A, 1B, 1C & 1D

Fig. 1A
Central Easel Arm (single) and
Sliding Clamps-Front View

Fig. 1B
Central Easel Arm
Side View

Fig. 1C
Central Easel Arm &
Camera Mount - Side View

Fig. 1D
Side View – Central Easel Arm w/Camera Mount Assembly
Attached

© 2017 by Robert A. Selwa

Fig. 1E

Central and Side Easel Arms (two-arm)
With Sliding Bar Clamps
Front View

© 2017 by Robert A. Selwa

Fig. 2A
Standard Camera Tripod (sketch)
w/o a ball head using a quick release plate Fig. 2B
Quick release plate (sketch)
as a camera mount assembly Fig. 2C
Standard Camera Tripod (sketch) w/o a ball head
and with the Quick Release plate detached © 2017 by Robert A. Selwa Fig. 2D
Sketch of Easel Mounted on a Standard Camera
Tripod - Side View Fig. 2E
Sketch of Easel Mounted on Camera Tripod
Front View © 2017 by Robert A. Selwa Fig. 3A
Sketch of a canvas directly secured with sliding bar clamps Fig. 3B
Easel at an angle from tripod head
(sketch)

Fig. 3C
Easel horizontal
(sketch)

© 2017 by Robert A. Selwa

Fig. 3D

Easel horizontal (rotated by tripod head)

(sketch)

Fig. 3E

Camera Tripod Head Mount with Rotational Ball (Sketch)

Fig. 3F

Camera Tripod Head Mount w/Ball attached to easel arm (Sketch)

© 2017 by Robert A. Selwa

Fig. 4

Side View of Easel Arm attaching to Head Mount attaching to Wall Mount attaching to a Wall © 2017 by Robert A. Selwa

Fig. 5

Side View of Easel Arm attaching to a Telescoping Arm
attaching to Wall Mount attaching to a Wall © 2017 by Robert A. Selwa

EASEL WITH A BUILT-IN CONNECTING DEVICE FOR A MOUNTING MECHANISM

CROSS-REFERENCE TO RELATED APPLICATIONS

This application claims the benefit of provisional application Ser. No. 62/195,550, filed Jul. 22, 2015 by the present inventor.

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

BACKGROUND

Field

This application relates to an easel, specifically artist and display easels.

Background of the Invention

Virtually every visual artist who paints needs an easel to mount his or her work. In this fast pace modern society, a versatile easel is desirable and almost necessary. Most easels are a simple mounting mechanism, and some now even rotate. Some other teachings and embodiments convert a camera tripod into an artist easel, but were quite cumbersome and overly complicated for a cost-effective solution. These embodiments address that problem.

U.S. Pat. No. 5,791,623—granted to Michael C. Louridas on Aug. 11, 1998 performs the same function of combining, adapting, and connecting an easel to a camera tripod as this first embodiment. I found that Louridas' solution was too complicated. This embodiment is much simpler and eliminates the need for a middle carriage bracket to interface between the camera tripod and easel arm.

SUMMARY OF THE EMBODIMENTS

These embodiments feature an easel arm, or arms, using an embedded connecting device and optional drill hole (or holes) for a mount nipple(s) or guide that will attach directly to a first embodiment camera tripod, or tripod-like mounting mechanism. The second embodiment attaches the easel arm(s) to a wall mount. The third embodiment attaches the easel arm(s) to a telescoping arm. By combining the features of the easel arm and tripod, this empowers the user to cost and space savings, along with adding the tripod-like features to the easel. These embodiments now afford more utility and value to the owner. These embodiments allow for the work piece to be secured to the tripod, wall mount, or telescoping arm, and be manipulated for height adjustment—to tilt, be rotated, and/or swivel according to the capabilities of the tripod, wall mount, or telescoping arm. Now the easel performs more than just a resting place for the work piece. This marriage of the easel and tripod functions allow for a new hybrid unit to be created. These embodiments now afford more utility and value to the owner.

ADVANTAGES

The advantage of this embodiment over prior art is the simplicity of directly attaching to the camera tripod mount and forgoing the perceived need for an intermediary carriage bracket interface as taught by Louridas—U.S. Pat. No. 5,791,623. There is a significant improvement in this embodiment that saves on the cost to manufacture the parts, and thus lowers the price of the product, and eliminates extra parts that could break down. These embodiments can be used on a stationary head tripod, tripods with rotatable heads, a wall mount, and even a telescoping arm. All these embodiments allow for an easy and quick attach method to connect the easel arm to the mounting mechanisms. All these features of rotation, swivel, height adjustment, etc. . . . . all make for a more pleasurable experience for the artist or presenter by being able to easily adjust the workpieces with little effort, less time, and no mess. These embodiment features add to the versatility of the previously separated units of camera tripod and easel, adds rotational qualities to the easel, acquires space savings by eliminating extra tripods or support structures, increases the value of the tripod and easel, and adds the capability of horizontal features used by watercolorists in making their art. The wall mount feature also saves space, and the telescoping arm adds more maneuverability in positioning the work piece.

DRAWINGS—REFERENCE NUMERALS

| | |
|---|---|
| 1 - Central Easel arm | 2 - Connecting device (insert nut) adapter |
| 3 - Drill hole for connecting device | 4 - Nipple guide hole |
| 5 - Guide Nipple on camera mount | 6 - Threaded securing screw on camera mount |
| 7 - Camera mount assembly (detachable here) | 8 - Sliding bar clamp assembly |
| 9 - Side arms | 10 - Drill hole |
| 11 - Insert nut | 12 - Thumb screw |
| 13 - Camera Tripod | 14 - Camera Head Mount |

| | |
|---|---|
| 15 - Canvas (w/rotational ball) | 16 - Screw |
| 17 - Bolt | 18 - Wall Mount |
| 19 - Wall | 20 - Telescoping Arm Assembly |
| 21 - Easel Arm Assembly | 22 - Rotational Ball |
| 24 - Camera Mount plate | 26 - Telescoping arm |
| 28 - Camera tripod male mount | 30 - Glue |
| 32 - Recessed hole for bolt | 34 - Camera Head Mount (standard w/o ball head) |
| 36 - Tripod head female mount | |

DRAWINGS—PARTS LIST—DETAILED DESCRIPTION

1—Central Easel arm—the main arm of the easel arm assembly (21) that connects to the camera mount assembly (7) by way of the connecting device (2).

2—Connecting device—in this case an insert nut with an ¼" inner threaded nut secured into the central easel arm (1) which the camera mount assembly (7) screws into with the threaded screw (6) and is held in place by the guide nipple (5) on the camera mount assembly (7).

3—Drill hole for connecting device (2).

4—Nipple guide hole on the central easel arm (1) for the guide nipple (5) on the camera mount assembly (7) to secure into.

5—Guide Nipple on camera mount assembly (7).

6—Threaded securing screw on the camera mount assembly (7) which screws into the connecting device (2) to fasten the mount assembly (7) to the central easel arm (1).

7—Camera mount assembly—usually detachable as a quick-release plate and attaches onto the central easel arm (1) by way of the easel arm connecting device (2). Comprised of the mount plate (24), guide nipple (5), the securing screw (6) and rear camera tripod male mount (28).

8—Sliding bar clamp assembly—the unit that slides up and down the easel arm and secures the work piece to the easel. Consists of the bar unit itself, the insert nut (11), and thumb screw (12).

9—Side arms—attached to the central easel arm (1) for the two-arm embodiment.

10—Drill holes—for screws (16) to secure the wall mount (18) to the wall (19).

11—Insert nut for bar clamps—secured into the front of the sliding bar clamps for the thumb screws to enter and secure onto the easel arm(s).

12—Thumb Screw—screwed into the front of the sliding bar clamp through the insert nut and presses into the easel arm to secure the bar clamps (8) to the easel arm(s) (1&9) when used to sandwich and secure the work piece (15) onto the easel arm.

13—Sketch of a standard camera tripod assembly.

14—Sketch of Camera Tripod Head Mount with Rotational Ball.

15—Canvas, or work piece.

16—Screws—to secure the wall mount (18) to the wall (19).

17—Bolt—set into the recessed hole (32) on the wall mount (18) to connect a mounting device (14), and/or a telescopic arm assembly (20).

18—Wall mount—to interface with the wall (19) and the central easel arm (1) by way of the camera head mount (14), or to a telescoping arm assembly (20).

19—Wall.

20—Telescoping arm assembly—to attach to the central easel arm (1) and wall mount (18). Comprised of the telescoping arm (26), and connecting mechanisms (14).

21—Easel arm assembly—includes the easel arm(s) (1, 9) with the connecting device (2) and the sliding bar clamp assemblies (8), and holds the work piece (15).

22—Rotational Ball—Ball encased in the tripod head mount (14) to provide rotational features for the attached easel arm (1) and the camera tripod (13).

24—Camera mount plate—the mounting plate that the central easel arm (1) rests on, and has the protruding camera tripod male mount (28) on the reverse side (if detachable as a quick-release plate).

26—Telescoping arm.

28—Camera tripod male mount (rear). This is the rear part of the detachable camera mount assembly (7) and mounts into the camera tripod head (34).

30—Glue. Used to glue the side arms (9) to the central easel arm (1).

32—Recessed hole—in the wall mount (18) for the bolt (17) to rest in.

34—Standard tripod head w/o a rotational ball and using a quick-release plate.

36—Tripod head female mount—recessed female mating unit for the tripod male mount (28) on the mount assembly (7) as a quick release plate.

DETAILED DESCRIPTION OF THE SPECIFIC EMBODIMENT

Description of First Embodiment—FIG. 1A-3F— Easel Arm w/Threaded Insert

Figure 1A:
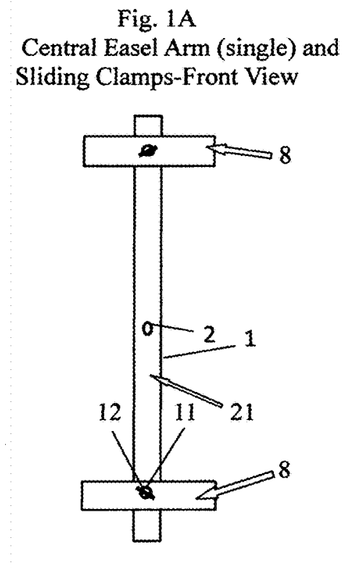
FIGS. 1A-1D—illustrate the easel arm with the connecting device for the mounting device along with the sliding bar clamps.

The first embodiment presented here in FIG. 1A is a central easel arm (1) with an insert nut or a threaded insert (2) as a connecting device (2) mounted securely into the center of the arm (1). The single arm (FIG. 1A) holds a work piece (15) securely on two sides by way of a set of sliding bar clamps (8). The bar clamps (8) secure themselves onto the easel arm (1) by way of a thumb screw (12) screwed through a bar clamp insert nut (11) and then presses into the arm (1) and held in place by pressure. Whatever the manufacturing technique used, the connecting device is secured into the middle and center of the central easel arm (1).

Figure 1B:
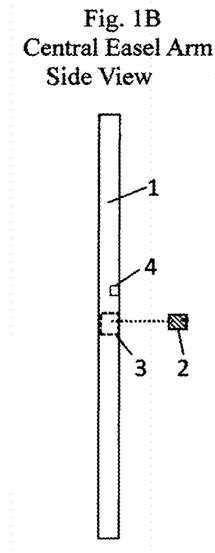

FIG. 1B is a side view of the central easel arm (1). A hole (3) is made in the center of the central arm (1) for the connecting device (2) (here an insert nut (11)) to be inserted, and secured into the central arm (1). A small drill hole (4) is made in the arm (1) for a nipple guide (5) on a camera mount assembly (7) to be inserted when attaching the arm (1) to the mount (7). The connecting device (2) here as an insert nut (11) has inner threads (¼ inch in this case) for a screw (6) on the mount (7) to screw into and be secured.

Figure 1C:
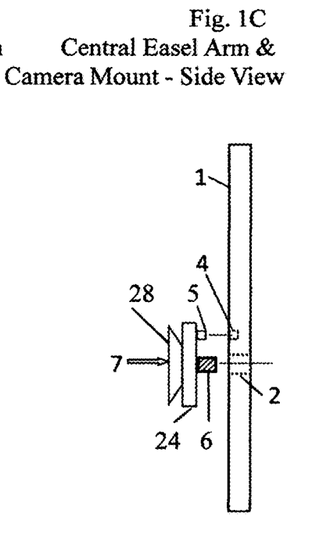
Figure 1D:
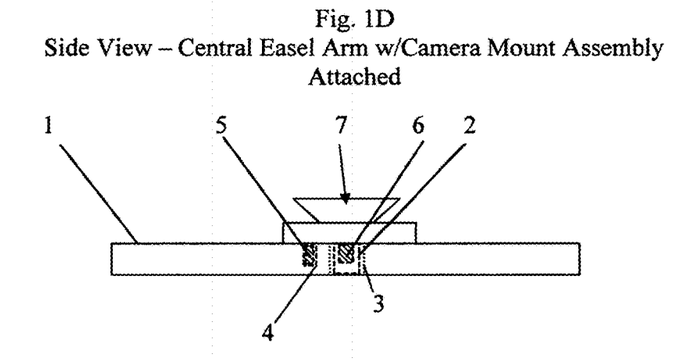

FIG. 1C teaches how the mount (7) is guided into the easel arm (1). FIG. 1D depicts the arm (1) mated to the mount (7) by way of the connecting device (2) and the screw (6), and the guide nipple (5) and a nipple guide hole (4). A camera tripod male mount (28) on the detachable mount (7) mates with a corresponding female mounting mechanism (36) on a tripod (13). The easel arm (1) rests on a camera mounting plate (24) that is part of the mount assembly (7).

Figure 1E:
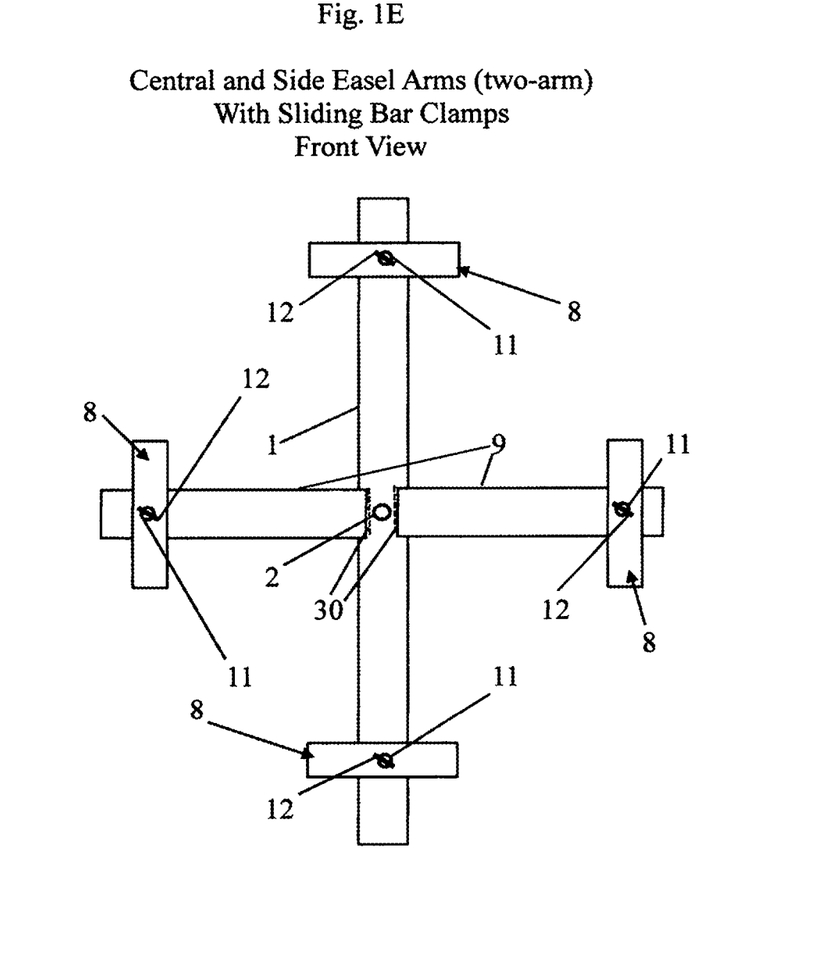
FIG. 1E—illustrates a two-arm embodiment with the embedded connecting device.

FIG. 1E teaches of a two-arm embodiment employing an additional set of side arms (9). The double easel arm (1 and 9) are attached together in a crisscrossed fashion with a glue (30) adhesive. Again, the connecting device (2) here is the insert nut (11) with inner ¼ inch threads inserted and secured into the center of the central arm (1). The central arm (1) connects to the mount (7) in the same fashion as the single arm embodiment. The two-arm embodiment adds extra support for the canvas by gripping the work piece (15) on all four sides.

Figure 2A:
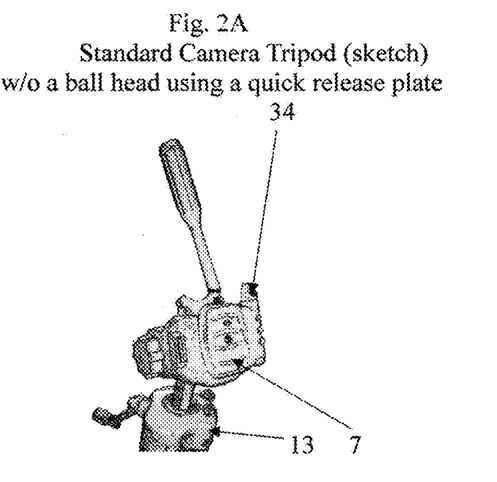
FIG. 2A—Close up sketch of a standard tripod head w/o a rotational ball and using a quick-release plate.
Figure 2B:
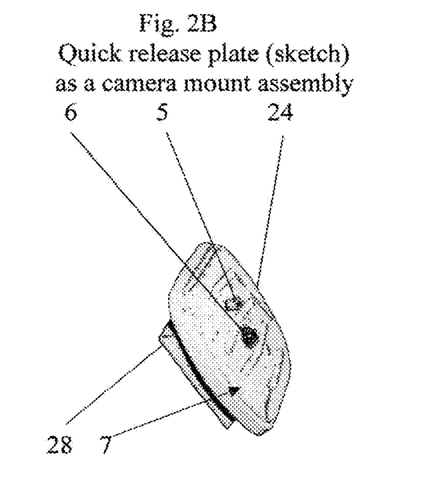
FIG. 2B—Close up of the camera mount assembly as a quick-release plate.
Figure 2C:
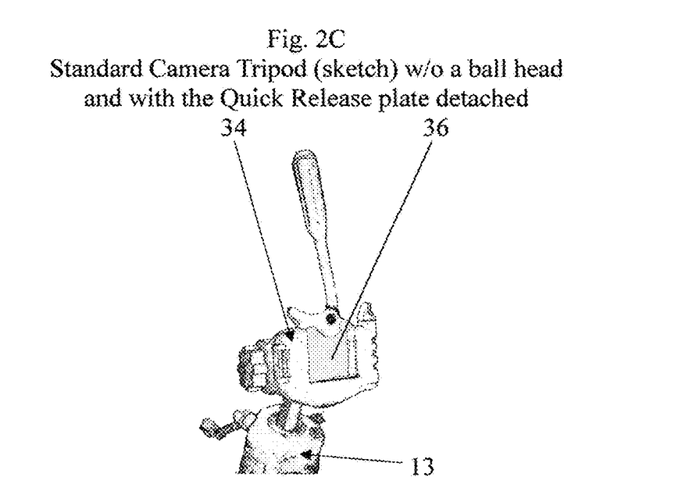
FIG. 2C—Close up sketch of a standard tripod head w/o a rotational ball and with the quick release plate detached.
Figure 2D:
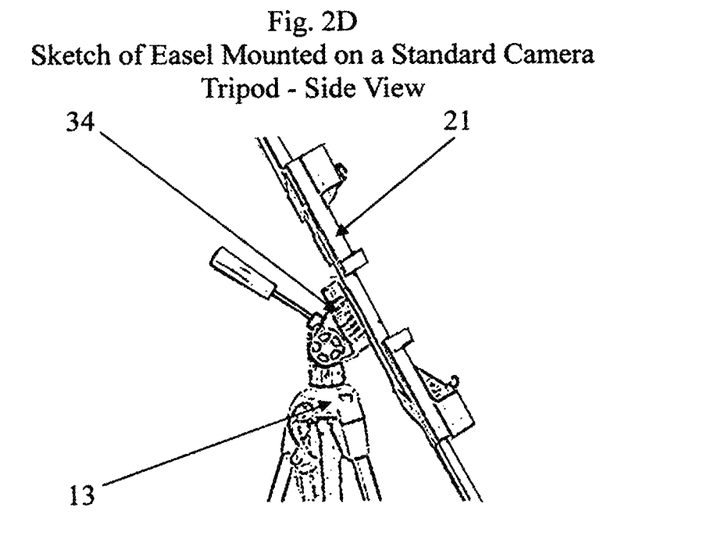
FIG. 2D—side view sketch illustrating the central easel arm attached to a camera tripod.
Figure 2E:
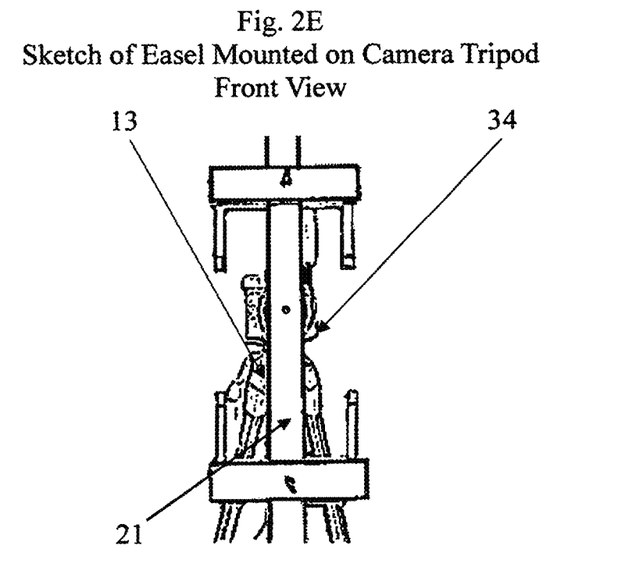
FIG. 2E—front view sketch illustrating the central easel arm attached to the camera tripod.

FIG. 2A shows the standard camera tripod (13) without a rotational head (34) and using a quick release mount assembly (7). FIG. 2B shows the mount assembly (7) as a quick release plate. FIG. 2C is the standard camera tripod (13) without a rotational head in FIG. 2A with the quick release mount assembly removed, or detached, and showing the female part of the head (36) where the mount assembly male part (28) is secured and locked into. FIG. 2D is a side view sketch of the easel arm (1) attached to the mount (7) and here mated to the camera tripod (13). FIG. 2E is a front view of the easel arm (1) attached to the tripod (13), with the sliding bar clamps (8) fastened to the central arm (1).

Figure 3A:
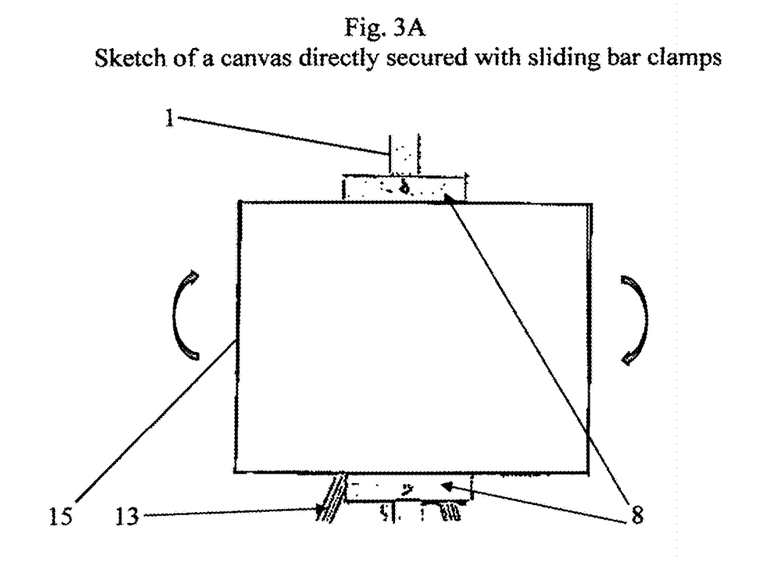
FIGS. 3A-3C—sketches of a canvas mounted on the easel and connected to a tripod, in various positions.
Figure 3B:
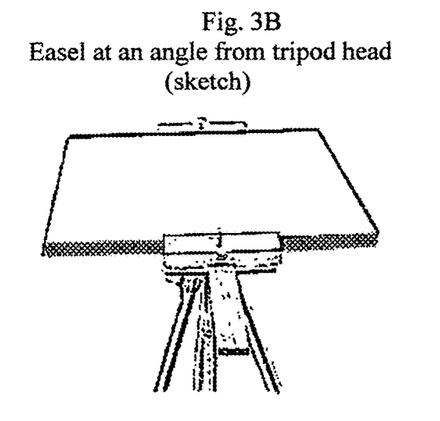
Figure 3C:
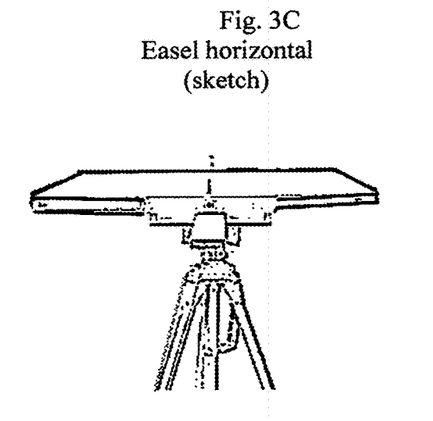
Figure 3D:
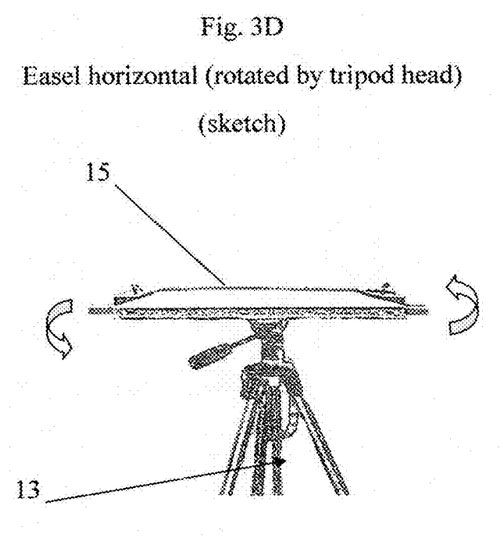
FIG. 3D—sketch of easel in the horizontal position that rotates.

FIG. 3A teaches of the canvas (15) being mounted on the tripod (13) by way of an easel assembly (21) which consists of the attached central easel arm (1) and the canvas (15) is held in place with the sliding bar clamps (8). FIG. 3B illustrates how the canvas can be manipulated and positioned according to the attributes afforded in the tripod design. FIG. 3C illustrates the canvas (15) being manipulated into a horizontal position. FIG. 3D illustrates how the swivel or rotational feature of the tripod mounting head mechanism rotates the canvas 360 degrees in either direction while in a horizontal (but not limited to) position.

Figure 3E:
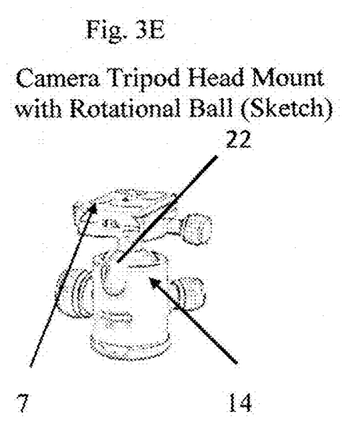
FIG. 3E—sketch of a camera tripod ball head that will rotate.
Figure 3F:
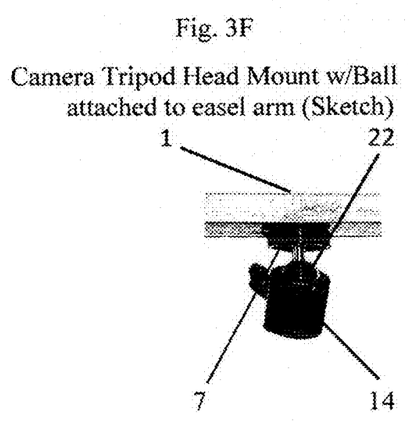
FIG. 3F—sketch of a tripod ball head attached to a central easel arm.

FIG. 3E is an example of a screw-on mount head (14) employing a rotational ball (22). This structure allows for the mount to swivel, tilt, and rotate on the tripod. FIG. 3F illustrates another ball head mount that is attached to the central easel arm (1). FIGS. 2D&E differ from 3F in that the head mounts differ in that the former doesn't have a ball head (22) to rotate, and the later does.

Operation of First Embodiment—FIGS. 1A-3F—
Easel Arm w/Threaded Insert

The central easel arm (1) attaches and is mated and secured to the camera mount (or other similar mating mechanism) (7) by screwing the mounting screw (6) into the inner threads of the threaded insert connecting device (2) in the easel arm (1). If there is the stabilizing nipple(s) (5) on the camera mount (7), this is lined up and inserted into the nipple guide hole (4) on the easel arm (1) to keep the mounted easel more secure. The easel arm (1) attaches to the mounting device (7) which then attaches to the rotational camera head mount (14) or the standard tripod head (34), or other suitable support structure. The work piece (15) is then placed on the easel assembly (21) and can then be maneuvered and adjusted into place as shown in FIGS. 2D and 2E.

The sliding bar clamps pictured here (8) slide on or over the easel arm (1) (or arms (1&9)), and are secured to the arm (1) (or arms (1&9) with a thumb screw (12). The canvas (15) is secured onto the easel (1) by being sandwiched (FIG. 3A) between the sliding bar clamps (8). The secured canvas or work piece (15) can then be maneuvered and positioned—being limited to the functions afforded by the camera tripod (13), to benefit the user.

FIG. 1E illustrates the attached second side arm (9) in a 2-arm (1 & 9) embodiment. The canvas (15) is now secured by the sliding bar clamps (8) on all four sides instead of just the two in the single arm embodiment. The work piece (15) again can now be adjusted and positioned according to the attributes of the tripod (13).

FIGS. 3A-3D illustrates how the easel assembly (21) looks attached to the tripod (13), the canvas (15) to the easel assembly (21), and then how the canvas (15) can be positioned and rotated on the tripod (13). The easel assembly (21) attaches to the support structure or tripod (13). The easel assembly (21) holds the work piece (15). Positioning and adjustments come by way of the tripod (13) and the type of head used (14 or 34).

Different mounting heads (14, 34) will attach in the same manner to the central easel arm (1) and transfer the different easel functions accordingly.

Figure 4:
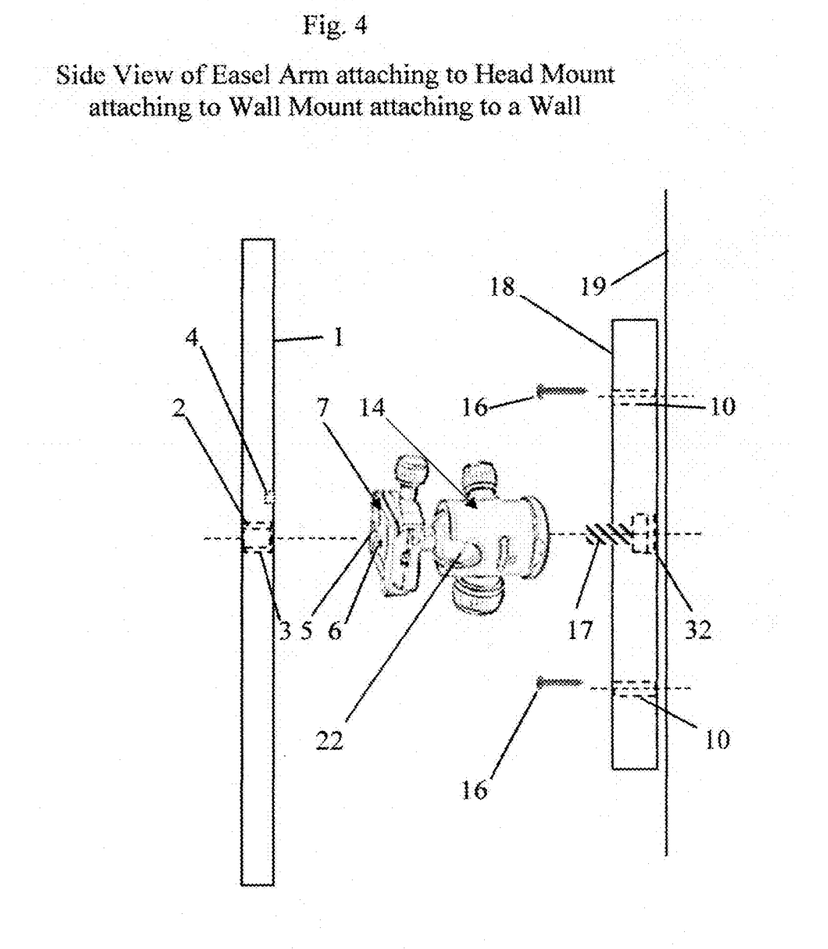
FIG. 4—side view of a central easel arm attached to a camera head mount, attached to a wall mount, attached to a wall.

Description of the Second Embodiment—FIG.
4—Easel Arm w/Threaded Insert Attached to a
Wall Mount FIG. 4 is an example of the head mount (14) employing the rotational ball (22) feature. This design allows for the easel arm (1) and the mounting device (7) to swivel, tilt, and rotate while attached to the wall mount (18). FIG. 4 illustrates how the easel arm (1) can be attached to the mounting mechanism (7) on the camera head mount (14) which is then attached to a wall mount (18) instead of the camera tripod (13) and affords the artist or presenter the ability to rotate and tilt his work piece while being mounted on a wall. This saves space in the artist's studio, and gives a presenter an option for displays. In FIG. 4 the easel arm (1) with the embedded connecting device (2) is attached to the mounting device (7) on the tripod head mount (14) employing the rotational ball (22) that is then attached to the wall mount (18). The wall mount (18) is attached to the wall (19) by a plurality of screws (16) screwed into a matching set of drilled out mounting holes (10) in the wall mount (18). A bolt (17) protruding from the front of the mount (18) and attached in the back through a recessed hole (32) is what attaches the mount head (14) to the wall mount (18).

Operation of Second Embodiment—FIG. 4—Easel
Arm w/Threaded Insert Attached to a Wall Mount The mounting mechanism (7) is screwed into the connecting device (2) in the easel arm (1) and is re-attached to the head mount (14) employing a rotational ball (22) and then to the wall mount (18), which then is attached to the wall (19). The canvas (15) is now secured by the sliding bar clamps (8).

The artist or presenter directly attaches the easel arm (1) to the mounting mechanism (7) and this is held in place with the nipple (5) and screw (6) on the mount (7) and mated with the drill hole (4) and connecting device (2) on the easel arm (1). The detachable head mount (14) here using the rotational ball (22) interfaces with the wall mount (18) and the easel arm (1). Instead of working off a support structure such as a camera tripod, the user works off an easel assembly (21) that is mounted and attached to a wall (19).

Figure 5:
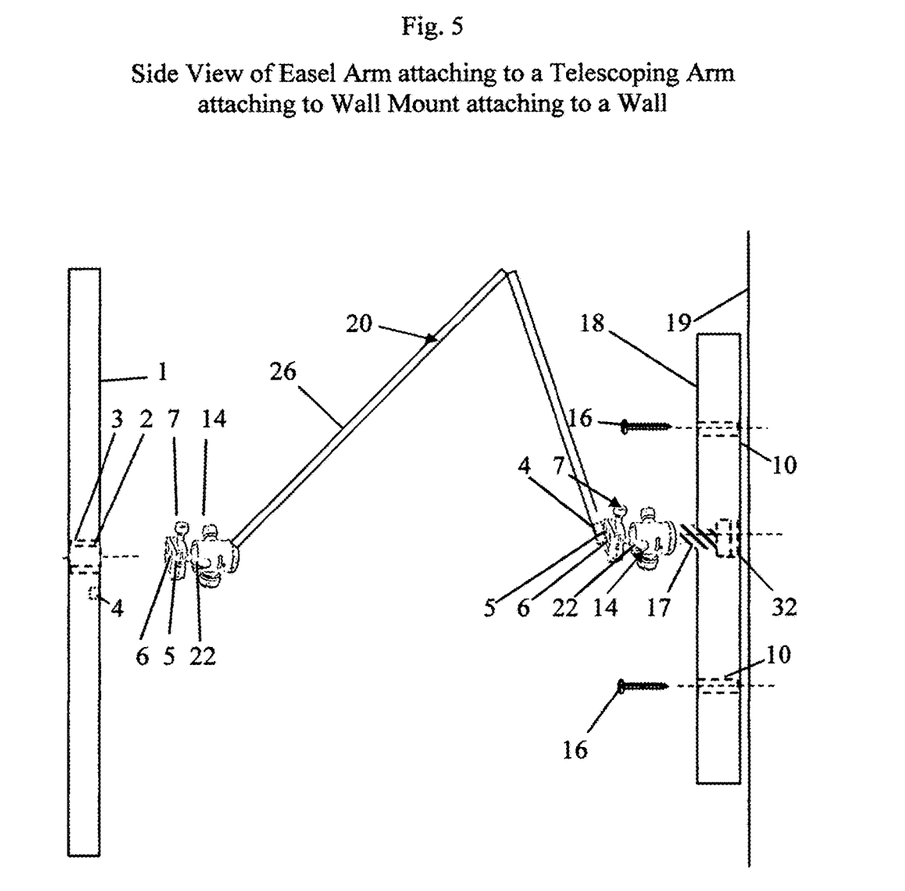
FIG. 5—side view of a central easel arm attached to a telescoping arm assembly, attached to a wall mount, attached to a wall.

Description of Third Embodiment—FIG. 5—Easel
Arm with Threaded Insert Attached to a Wall
Mount and a Telescoping Arm FIG. 5 teaches how the easel arm (1) with the embedded connecting device (2) is attached directly to a telescoping arm assembly (20) that is attached to the wall mount (18), enabling the canvas or work piece (15) to be adjusted for distance and height, and even with rotating features found on the head mount (14). This is an example of what can be done with the telescoping arm assembly (20) with this direct attach easel arm (1) and connecting device (2). A telescoping arm (26) connects to the head mounts (14). The wall mount (18) and mounting head (14) in the second embodiment is used to attach to the telescoping arm assembly (20). Here an extra ball head mount (14) is used to attach the telescoping arm (26) to the central easel arm (1).

Operation of Third Embodiment—FIG. 5—Easel Arm w/Threaded Insert Attached to a Wall Mount and a Telescoping Arm The telescoping arm (20), gives the user the added ability to adjust the distance of the work piece from himself and the wall mount (18) to a more comfortable distance and height. The easel arm (1) attaches to the mount assembly (7) and head mount (14) on the telescoping arm (26) and is pulled out or pushed in, or otherwise maneuvered depending on the design of the telescoping arm (26). The artist can then sit or stand and adjust the distance of the work piece, and maneuver the workpiece into the desired position.

The wall mount (18) is attached to the wall (19). The telescoping arm assembly (20) is attached to the wall mount (18), and in this design the tripod head (14) connects to both ends of the arm assembly (20) which then connects to the easel arm (1). The tripod head (14) with rotational features will allow the work piece to be rotated and tilted along with adjusting the distance and height. All these options give the artist the added ability, ease, and comfort to focus more on his work piece and creation. The two rotational heads (14) on the telescoping arm assembly (20) allow for versatility in the number of possible adjustable positions. The one arm easel (1) or the two arm (1&9) embodiment can be used here and this easel arm assembly (21) still uses the sliding bar clamps (8) to secure the work piece (15) to the easel assembly (21).

Construction of the Embodiments

Necessary Building Tools—

| | |
|---|---|
| 1. | Table saw |
| 2. | Orbital sander |
| 3. | Drill bits |
| 4. | Screwdriver |
| 5. | Hammer |
| 6. | Drill press |

The construction of these embodiments is simple. The easel arm (1) in this case is made of ½ inch thick wood (poplar or oak) with a width of approximately 2 inches and 24" long. These dimensions and materials can be varied using the same basic design employed here. In the center (both length and width) of the easel arm (1) a hole is drilled (3) (about ⅜-inch-wide in this case) through the center arm(s) (1) for the threaded insert connecting device (2) to fit into, and be secured. This threaded insert could be an insert nut or some other threaded insert that is secured into the hole (3) of the easel arm (1). The threaded insert should be compatible with the present ¼ inch machine screw threads found in most camera mounts.

In the two-arm embodiment (FIG. 1E), the central arm (1) is notched out on both sides in the middle so side arms (9) can be fitted and secured into the central arm (1). In this case with glue.

For the wall mount embodiment in FIG. 4 the wall mount is a single piece of wood with a set hole on one side for a bolt (17) to securely sit and attach at the other end to the camera head mount assembly (14).

CONCLUSION, RAMIFICATION, AND SCOPE

The reader will see that at least one embodiment of the easel arm utilizes the already designed and manufactured aspects of preexisting camera tripods with or without a detachable mount and a rotational ball head, which then adds the extra utility for a direct attach easel to provide rotational, tilting, and height adjustments normally not present in most standard easels. These embodiments are not restricted or limited to mate with any single type of camera head mount or tripod—rotational, detachable, or otherwise, nor to a camera tripod itself. This direct attach feature and capacity is universal in its ability to mate with any accommodating camera mount assembly or any other similar mating and mounting mechanism or support structure—preexisting, or specially manufactured for this purpose. The mount is what the central easel arm attaches to.

The direct attachment feature of this embodiment eliminates the need for an intermediate carriage bracket to interface between the easel arm and the camera tripod mounting device. This is a much simpler embodiment over prior art.

The use of readily obtainable materials and hardware in those embodiments are desirable for easy replacement and repair of the embodiments. However, the envisioned embodiments are not limited to preexisting parts.

The easel arm and any of the parts can be made of any suitable material—plastic, wood, metal, or composite material, but not limited to such, and be constructed in any size, shape, or color. The connecting device in these embodiments use a threaded insert nut to connect the easel arm to the camera tripod. The connecting device could be an insert nut, or a specially made threaded insert to be pressed, screwed in, or otherwise secured into the center of the easel arm. The connecting device could be made to be part of the arm itself. The connecting device is what marries the easel arm to the camera tripod. The connecting device accommodates a ¼ inch machine screw for present camera tripod mount models, but this can vary to accommodate any type of past, present or future camera tripod mount, or other support mechanism. This embodiment is designed to attach to a pre-existing camera tripod, but is not limited to such. A specific and distinct tripod made to be used for both a camera and the easel arm, could also be designed and built. A specially designed tripod or similar structure could be built specifically for easel use with the necessary specifications for that work load, and may also contain camera capabilities for extended utility—all using this direct-attach design. Other accommodating support structures than a camera tripod could be used. The easel arm embodiment can be made as a one or two-arm model. The two-arm embodiment allows for added stability in mounting the workpiece.

These embodiments are envisioned and designed for use by an artist or a presenter to provide extra functionality in their workspace. However, other unintended uses and variations could also be made of this embodiment using this general design. These embodiments could also be used to hold other items besides an artist canvas.

These embodiments could also be motorized so that the easel assembly attaches to a different mount (7) other than the camera tripod mounts and can be mechanically and remotely adjusted for more ease, or by the disabled.

A plurality of designs could be used to build and manufacture a two-arm embodiment and is not limited to the design of the embodiment presented here. The two arms could be juxtaposed, coupled, mounted, and attached at 90-degree angles in a variety of manners.

The wall mount itself could have its own mounting mechanism and be designed as a stationary or rotational embodiment. Existing tripod head mounts (14) with a mounting mechanism (7) can be used, or specially designed similar mounting mechanisms for just this purpose can be used to join the embedded connecting device (2) in the easel arm (1) with the mounting device of the wall mount (18) and the easel arm (1). The wall mount could be stationary, or also be equipped with a sliding mechanism to adjust the height. The wall mount could have its own method to direct attach to the easel arm. The wall mount could also be attached to the wall in a variety of manners and could also attach to another mounting surface.

An embodiment with a connecting device attached and added to the easel arm to connect with the camera mount assembly is still considered a direct attach model.

What I claim is:

1. An easel consisting of: a one-piece, continuous, central easel arm with an embedded connecting device secured into a hole in a center of said central arm, said embedded connecting device attaching said central arm to a mounting mechanism, at least one guide hole on said central arm to mate with a nipple on said mounting mechanism, the mount comprising a first camera head mount including a rotational ball; a pair of side easel arms, each side easel arm extending outwards from respective opposing sides of the central arm where the hole is located and attached to the central arm at a first end of the respective side arm; a plurality of sliding bar clamps, respective ones of the sliding bar clamps attached to respective ends of the central arm, and to respective second ends of each of the side easel arms which is opposite to the first end of the side easel arms.

2. An easel comprising: at least one continuous, one-piece easel arm with an embedded connecting device secured into a hole in a center of said at least one arm, said embedded connecting device attaching said at least one arm to a mounting mechanism, at least one guide hole on said at least one arm to mate with a nipple on said mounting mechanism; a plurality of sliding bar clamps, respective ones of the sliding bar clamps attached to respective ends of the at least one arm; the mount comprising a first camera head mount including a rotational ball, said mount attaching to a wall mount via a telescoping arm and a second wall mount, the second wall mount comprising a second camera head mount including a rotational ball, the second mount attaching the telescoping arm to the wall mount via a bolt located in a center of the wall mount, and the wall mount including a plurality of holes and screws for attachment to a wall surface.

3. An easel comprising: at least one continuous, one-piece easel arm with an embedded connecting device secured into a hole in a center of said arm, said embedded connecting device attaching said at least one arm to a mounting mechanism, at least one guide hole on said at least one arm to mate with a nipple on said mounting mechanism; a plurality of sliding bar clamps, respective ones of the sliding bar clamps attached to respective ends of the at least one arm; the mounting mechanism comprising a first camera head mount including a rotational ball, said mounting mechanism directly attaching to a wall mount, the mounting mechanism directly attaching to the wall mount via a bolt located in a center of the wall mount, and the wall mount including a plurality of holes and screws for attachment to a wall surface.

* * * * *